US011767814B2

(12) United States Patent
Feng et al.

(10) Patent No.: US 11,767,814 B2
(45) Date of Patent: Sep. 26, 2023

(54) EXHAUST GAS HEATING DEVICE, ASSOCIATED EXHAUST LINE AND VEHICLE

(71) Applicant: FAURECIA SYSTEMES D'ECHAPPEMENT, Nanterre (FR)

(72) Inventors: Ting Feng, Vieux-Charmont (FR); Christophe Basso, Chatenois les Forges (FR); Alain Mercier, Nommay (FR); Thomas Ferrier, Montbeliard (FR); Gaetan Richard, Belfort (FR); Thomas Sommier, Belfort (FR)

(73) Assignee: FAURECIA SYSTEMES D'ECHAPPEMENT (FR)

( * ) Notice: Subject to any disclaimer, the term of this patent is extended or adjusted under 35 U.S.C. 154(b) by 388 days.

(21) Appl. No.: 17/215,037

(22) Filed: Mar. 29, 2021

(65) Prior Publication Data

US 2021/0301767 A1 Sep. 30, 2021

(30) Foreign Application Priority Data

Mar. 30, 2020 (FR) ..................................... 20 03132

(51) Int. Cl.
*F01N 3/10* (2006.01)
*F02M 26/13* (2016.01)
(Continued)

(52) U.S. Cl.
CPC ......... *F02M 26/13* (2016.02); *B60R 16/0215* (2013.01); *H05B 3/10* (2013.01); *H05B 2203/016* (2013.01)

(58) Field of Classification Search
CPC ...... F02M 26/13; B60R 16/0215; H05B 3/10; H05B 3/03; H05B 3/06; H05B 3/265;
(Continued)

(56) References Cited

U.S. PATENT DOCUMENTS

| 4,505,107 A | 3/1985 | Yamaguchi et al. |
| 5,245,825 A * | 9/1993 | Ohhashi ................... H05B 3/12 422/174 |

(Continued)

FOREIGN PATENT DOCUMENTS

| DE | 112016005249 T5 | 8/2018 |
| DE | 102018108032 A1 | 10/2018 |

OTHER PUBLICATIONS

Preliminary Research Report for French Patent Application No. FR2003132 dated Jun. 15, 2020.

*Primary Examiner* — Audrey B. Walter
*Assistant Examiner* — Dapinder Singh
(74) *Attorney, Agent, or Firm* — Carlson, Gaskey & Olds, P.C.

(57) ABSTRACT

An exhaust gas heating device includes a housing and a heating element arranged in the housing for heating exhaust gases flowing through the housing. The heating element comprises a first and a second connecting region. A power source for supplying electricity to the heating element, comprises a first connecting element, connected to the first connecting region of the heating element, and intended to supply the heating element (18) with electricity, and a second connecting element. The electrical power source comprises a third connecting element that comprises an electrical connector, electrically connecting the second connecting element to the second connecting region of the heating element.

13 Claims, 3 Drawing Sheets

(51) Int. Cl.
B60R 16/02 (2006.01)
H05B 3/10 (2006.01)

(58) Field of Classification Search
CPC .............. H05B 3/283; H05B 2203/016; H05B 2203/024; H05B 2203/007; H05B 2203/022; H05B 2203/014; F01N 3/2013; F01N 3/2026; F01N 3/027; F01N 3/0892; F01N 9/00; F01N 13/08; F01N 2240/16; F01N 5/02; Y02A 50/20; Y02T 10/12; Y02T 10/40

See application file for complete search history.

(56) References Cited

U.S. PATENT DOCUMENTS

| | | | | |
|---|---|---|---|---|
| 5,749,223 | A * | 5/1998 | Kreucher | F01N 3/2013 422/174 |
| 6,025,578 | A * | 2/2000 | Bruck | F01N 3/2026 422/177 |
| 6,031,213 | A * | 2/2000 | Hashimoto | F01N 3/2026 422/174 |
| 9,393,521 | B2 * | 7/2016 | Brueck | F01N 3/2026 |
| 11,486,286 | B2 * | 11/2022 | Kurpejovic | F01N 3/027 |
| 2007/0220870 | A1 | 9/2007 | Gonze et al. | |
| 2011/0286890 | A1 | 11/2011 | Kakinohana et al. | |

* cited by examiner

EXHAUST GAS HEATING DEVICE, ASSOCIATED EXHAUST LINE AND VEHICLE

CROSS-REFERENCE TO RELATED APPLICATIONS

This application is a U.S. non-provisional application claiming the benefit of French Application No. 20 03132, filed on Mar. 30, 2020, which is incorporated herein by reference in its entirety.

TECHNICAL FIELD

The present disclosure relates to an exhaust gas heating device, comprising a housing having a peripheral wall extending along a central axis and delimiting an exhaust gas circulation passage, and a heating element arranged in the housing and intended to heat the exhaust gas flowing through the housing. The heating element comprises a first and a second connecting region arranged on either side of this heating element. A power source for supplying electrical power to the heating element comprises a first connection element, connected to the first connection region of the heating device, and intended to supply electricity to the heating element, the first connection element comprising a first electrode passing through the peripheral wall of the housing, and a second connection element, comprising a second electrode for supplying electricity to the heating element.

BACKGROUND

Exhaust lines of systems equipped with combustion engines, and especially vehicles, typically comprising catalytic purification devices, allow for example, to convert NOx, CO, and hydrocarbons into $N_2$, $CO_2$ and $H_2O$. Such devices are only effective when the catalytic material is at a minimum temperature.

To remedy this problem, it has been proposed to form exhaust lines comprising exhaust gas heating devices so that the catalytic material of the exhaust gas purification devices is quickly at a minimum temperature.

Such heating devices typically comprise a heating element and a power source that supplies electrical power to the heating element. The power source comprises a first and a second connection element, connected to a first connection region and a second connection region.

However, such a device is not completely satisfactory. Indeed, in some cases, due to the configuration of the heating element, the first and second connection elements extend radially on either side of a heating device housing at 180° to each other, which is cumbersome and makes it difficult to connect the first and second connection elements to an electrical power source in a restricted vehicle environment.

SUMMARY

The subject of the disclosure offers a heating device which reduces the space required and provides easy connection to an electrical power source.

For this purpose, the disclosure provides an exhaust gas heating device in which the electrical power source comprises a third connection element comprising an electrical connector, electrically connecting the second connection element to the second connection region of the heating device.

In the disclosure, the heating element still requires connecting regions at 180° to each other, but the third connecting element is capable of connecting the second connecting region to the second electrode, by bypassing the heating element, so that the second electrode does not need to be radially disposed at the second connecting region.

A heating device comprising such a third connection element is therefore particularly advantageous since such a third connection element can be arranged radially and axially independently of the configuration of the heating device, the positioning of such an element being then advantageously adapted to reduce the space required and facilitate connection to an electrical power source.

According to particular embodiments of the disclosure, the heating device has one or more of the following features, taken alone or in any technically possible combination(s): the first and second electrodes extend radially from the heating element and together form an angle around the central axis which is less than 180°, preferably less than 120°, and even more preferably less than 90°; the electrical connection extends in a space radially delimited between the heating element and the peripheral wall of the housing, the electrical connection comprising a connection mat covered with an insulating layer, the second electrode being connected to the connection mat and passing radially through the peripheral wall and the insulating layer; the electrical connection extends around the housing, the electrical connection forming a connection cable comprising a core and an insulation sheath, the second connection element comprising an insulation foot, the insulation foot securing the second electrode to the housing, the second electrode being connected to the core of the cable formed by the electrical connection; the heating element comprises a metallic foam adapted to heat by joule effect when supplied with electricity by the electrical power source; the metal foam comprises a plurality of through slots extending parallel to the central axis, the through slots defining a circuit for the flow of electricity back and forth through the metal foam; and the second connecting element is offset axially from the first connecting element, the second connecting element extending upstream or downstream of the first connecting element, the axial offset between the first connecting element and the second connecting element being advantageously less than 100 mm, preferably less than 50 mm and even more preferably less than 10 mm.

The disclosure provides an exhaust line comprising a heating device as aforesaid.

The disclosure relates furthermore to a vehicle comprising an exhaust line as aforesaid.

BRIEF DESCRIPTION OF THE DRAWINGS

Other features and advantages of the disclosure will appear when reading the description that follows, given only as an example and made with reference to the appended drawings, in which.

DETAILED DESCRIPTION

In the rest of the description, "a temperature around" means a temperature within a range of plus or minus 10° C. around the quoted temperature.

In the remainder of the description, the term "connected" is used to refer to an electrical connection.

The terms upstream and downstream are further defined in terms of the direction of flow of a fluid from a source, with an upstream point being closer to the source of the flow than a downstream point.

Figure 1:
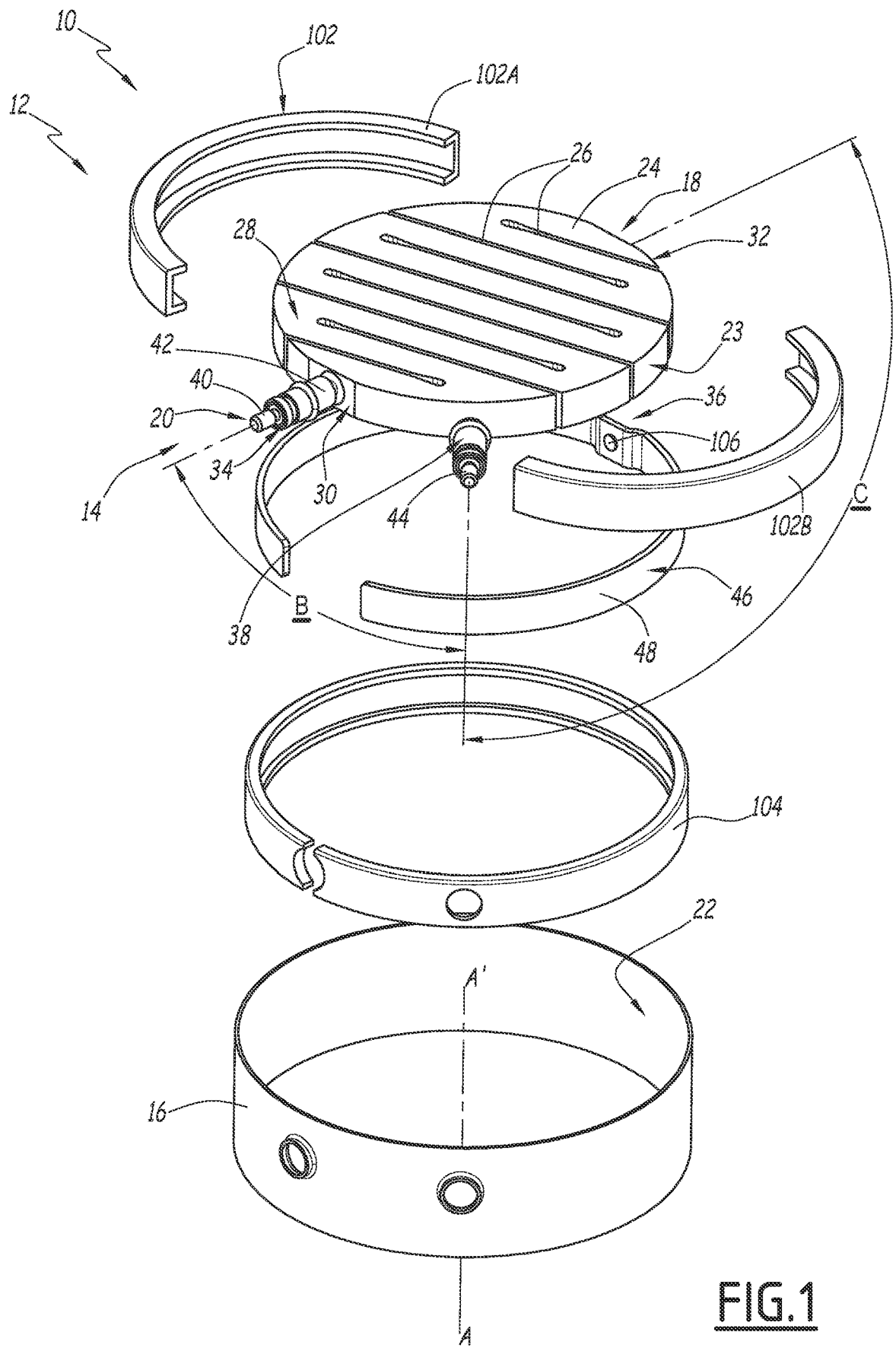
FIG. 1 is an exploded schematic representation of a heating device according to a first embodiment of the disclosure.

With reference to FIG. 1, a vehicle 10 includes an exhaust line 12. Vehicle 10 is, for example, a motor vehicle such as a car or truck. Vehicle 10 includes an internal combustion engine (not shown) for example, used to propel the vehicle 10 or to supply power to the vehicle 10 systems.

The exhaust line 12 advantageously comprises an exhaust gas purification device (not shown).

The exhaust line 12 comprises an exhaust gas heating device 14.

The heating device 14 is preferably located between the internal combustion engine and the exhaust gas purification device and is intended to heat the exhaust gas before it enters the exhaust gas purification device.

The heating device 14 comprises a housing 16, a heating element 18, and a power source 20 for supplying power to the heating element 18.

The housing 16 comprises a peripheral wall 22 extending along a central axis A-A' and delimiting an exhaust gas flow passage. In particular, the housing 16 comprises an upstream end and a downstream end and is shaped to guide the exhaust gases from the upstream end to the downstream end.

For example, the housing 16 is tubular in shape and forms an exhaust gas flow duct.

The heating element 18 is designed to heat the exhaust gas flowing through the housing 16. For example, the heating element 18 is suitable for heating by the joule effect when electricity flows through it.

The heating element 18 is located in the housing 16. The heating element 18 extends, for example, transversely to the central axis A-A' in housing 16. The heating element 18 comprises a periphery 23.

In the variant according to which the housing 16 is tubular, the heating element 18 presents, for example, substantially disc-shaped and extends into the circulation duct formed by the housing 16.

The heating element 18 preferably comprises a metal foam 24.

Preferably, the metal foam 24 is made of an iron-chromium-aluminum alloy (FeCrAl) or a nickel-chromium alloy (NiCr). The metal foam 24 presents a density of 8-11% and a thickness (considered in the direction of the central axis A-A') between 5 and 50 mm, preferably between 15 and 30 mm.

The metal foam 24 preferably comprises a plurality of through slots 26 extending parallel to the central axis A-A'. The through slots 26 pass through the metal foam 24 from the upstream end of the metal foam 24 to the downstream end of the metal foam 24.

The set of through slots 26 defines a circuit 28 for the flow of electricity through the metal foam 24.

For example, the through slots 26 run parallel relative to each other.

Figure 2:
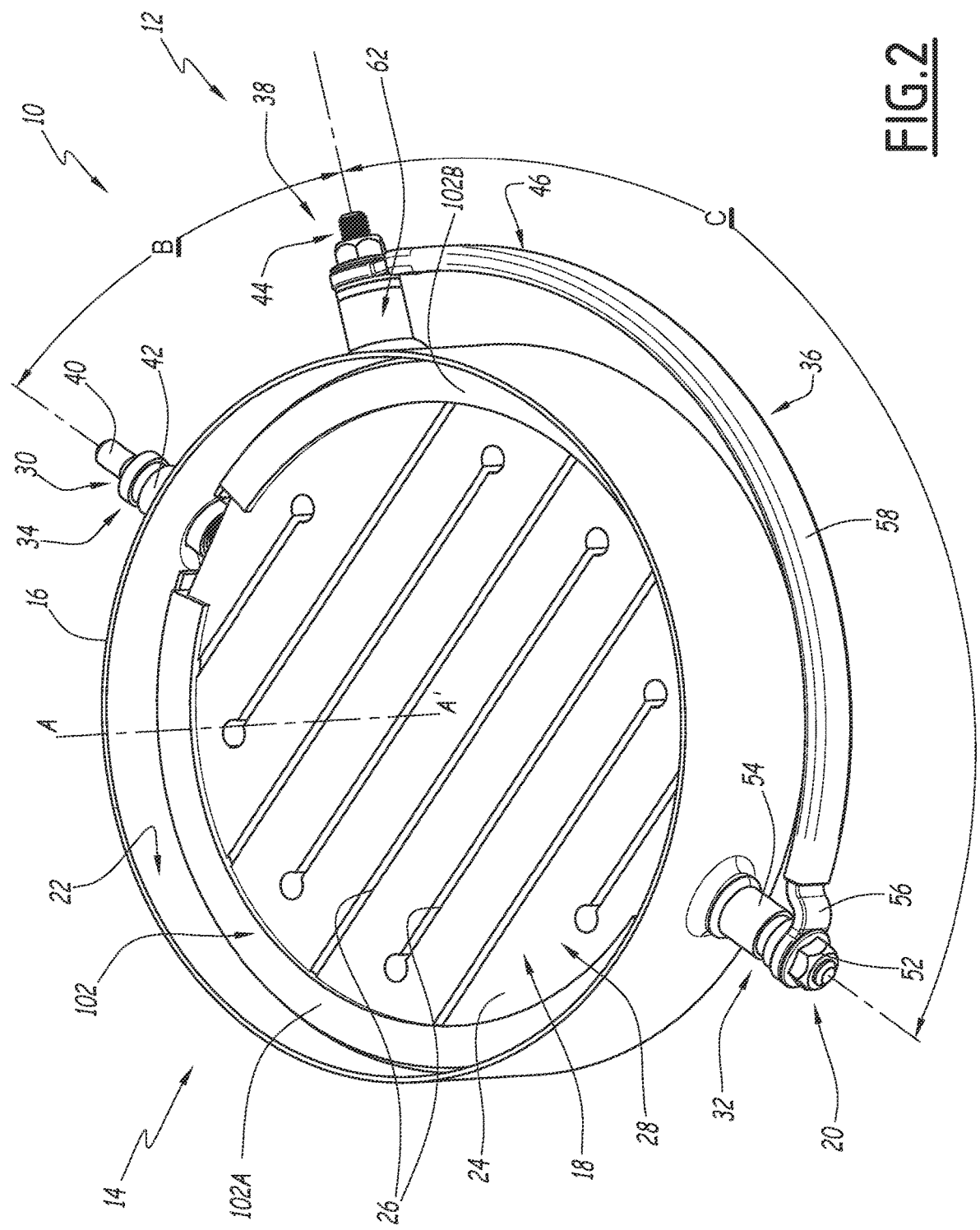
FIG. 2 is an exploded schematic representation of a heating device according to a second embodiment of the disclosure.

Each of the through slots 26 preferably opens at the periphery 23 of the heating element 18 on one hand and is delimited by a section of metal foam 24 on the other hand. As shown in FIGS. 1 and 2, the through-slot 26 widens, for example, at its end closest to the portion of metal foam 24 delimiting the slot.

For example, two adjacent through-slots 26 open onto the periphery 23 of the heating element 18 according to an opposite orientation, perpendicular to the central axis A-A' and to the normal of the plane according to which each through-slot 26 extends.

The circulation circuit 28 is then, for example, in a back and forth configuration.

It should be recalled here that the term "back and forth" refers to a continuous line extending alternately from one edge to the other of the heating element 18, changing direction at each edge (by analogy with furrows in a field). The circulation circuit 28 thus forms substantially parallel lines, each connected at each of its ends to a respective adjacent line.

The circulation circuit 28 is then configured to guide the electricity flowing through the metal foam 24 in a plane perpendicular to the central axis A-A'. The circulation circuit 28 is then configured to distribute the heat generated by the joule effect in a plane perpendicular to the central axis A-A'.

The heating element 18 comprises a first connection region 30 and a second connection region 32. The first connection region 30 and the second connection region 32 extend in particular to the periphery 23 of the heating element 18. The first connection region 30 extends, for example, on the side opposite the second connection region 32 relative to the axis A-A', preferably according to an axis perpendicular to the plane in which each of the through slots 26 extends.

The first connection region 30 and the second connection region 32 form the ends of the circulation circuit 28 of the heating element 18.

The electrical power source 20 of the heating element 18 is intended to supply the heating element 18 with electricity, preferably for heating the heating element 18.

The electric power source 20 of the heating element 18 is, for example, suitable for connection, on the one hand, to an electrical power supply (not shown) and on the other hand to the heating element 18.

The power source 20 comprises a first connection element 34, a second connection element 38, and a third connection element 36.

The first connection element 34 is connected to the heating element 18. The first connection element 34 is intended to supply the electrical power to the heating element 18. The first connection element 34 preferably extends radially from the heating element 18.

The first connection element 34 is preferably connected to the first connection region 30 of heating element 18. The first connecting element 34 is, for example, screwed and/or soldered to the heating element 18.

The first connection element 34 comprises a first electrode 40 and a first insulation contour 42.

The first electrode 40 passes through the peripheral wall 22 of the housing 16. The first electrode 40 extends, for example, substantially radially relative to the housing 16. The first electrode 40 is connected to the heating element 18.

The first insulation contour 42 is, for example, arranged around the first electrode 40 and is intended to electrically insulate the first electrode 40 from the housing 16.

The second connecting element 38 comprises a second electrode 44.

The second electrode 44 extends radially from the heating element 18. The second electrode 44 forms with the first electrode 40 an angle B around the central axis A-A'. The angle B is greater than 0° and less than 180°, preferably less than 120°, preferably less than 90°, preferably less than 60°, preferably less than 45°, preferably less than 30°, preferably less than 20°, preferably less than 10°. The angle B formed between the first electrode 40 and the second electrode 44 is, for example, the smallest possible angle at which the first electrode 40 and the second electrode 44 are not in electrical contact.

In a particular embodiment, the second connecting element 38 is axially offset from the first connecting element 34. In particular, the second connecting element 38 then extends upstream or downstream of the first connecting element 34. The axial offset between the first connecting element 34 and the second connecting element 38 is for example, less than 100 mm, preferably less than 50 mm and even more preferably less than 10 mm. The position of the second connecting element 38 is, according to different embodiments, offset radially from the first connecting element 34 by an angle B which can be selected in the design of the heating device 14 and/or axially offset from the first connecting element 34 by an axial offset which can be selected in the design of the heating device 14.

The third connecting element 36 is intended to be connected to the second connecting region 32 of the heating element 18. The third connecting element 36 comprises an electrical connection 46 for connecting the second connecting element 38 to the second connecting region 32 of the heating element 18.

The electrical connection 46 is connected on one hand to the second electrode 44 of the second connecting element 38 and on the other hand to the second connecting region 32 of heating element 18.

The electrical connection 46 extends around heating element 18. The electrical connection 46 preferably extends in an arc around the heating element 18. In particular, the electrical connection 46 extends in an arc of a circle of angle C, for example, between 0° and 180°, preferably greater than 60°, preferably greater than 90°.

With reference to FIG. 1, a first embodiment of the exhaust gas heating device 14 will now be presented.

According to this embodiment, the electrical connection 46 extends into a space radially delimited between the heating element 18 and the peripheral wall 22 of the housing 16.

Figure 3:
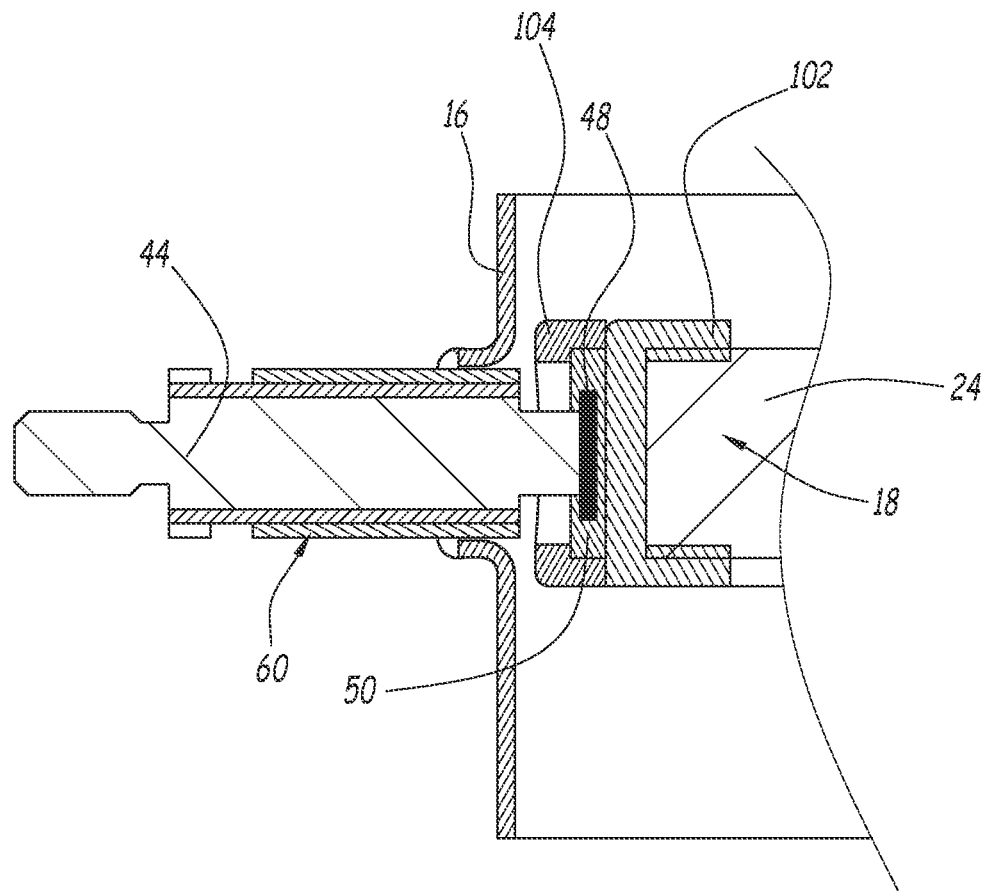
FIG. 3 shows a schematic representation of a detail of the heating device according to the embodiment of FIG. 1.

In the example shown in FIG. 3, which shows a detail of this embodiment, the electrical connection 46 comprises a connecting mat 48 covered with an insulation layer 50. According to this embodiment, the electrical connection 46 is rigid.

The second connecting element 38 comprises the second electrode 44 and a second insulation contour 60.

The second electrode 44 is then connected to the connecting mat 48. The second electrode 44, according to this embodiment, passes through the peripheral wall 22 of the housing 16 and the insulation layer 50.

The second insulation contour 60 is, for example, arranged around the second electrode 44 and is intended to electrically insulate the second electrode 44 of the housing 16.

As shown in FIG. 3, the insulation layer 50 additionally comprises an inner insulation reinforcement 102 and an outer insulation reinforcement 104. In one particular example (not shown), the insulation layer 50 is formed by the inner reinforcement 102 and the outer reinforcement 104.

The inner reinforcement 102 is intended to insulate a portion of the connecting layer 48 from the heating element 18. In particular, the inner insulation layer 102 comprises a first inner reinforcement 102A and a second inner reinforcement 102B. The first inner reinforcement 102A and the second inner reinforcement 102B are preferably placed between the connecting mat 48 and the heating element 18.

The first inner reinforcement 102A and the second inner reinforcement 102B are angularly spaced from each other defining a passage space for the first connecting element 34 and a passage space for the third connecting element 36.

The outer insulating reinforcement 104 is preferably arranged between the connecting mat 48 and the housing 16. The outer insulating reinforcement 104 is intended to electrically insulate the connecting mat of the housing 48 from the housing 16. The outer insulating reinforcement 104 comprises through holes for the first electrode 40 and for the second electrode 44.

Advantageously, the connecting mat 48 comprises a pin 106 connecting this connecting mat 48 to the heating element 18.

According to one variant, the connecting mat 48 can be soldered to heating element 18, or in another variant, the connecting mat 48 is stripped of the insulation layer 50 to be in direct contact with the second connecting region 32.

With reference to FIG. 2, a second embodiment of the exhaust gas heating device 14 will now be presented. This embodiment differs from the first embodiment only in the following. The analogous elements have the same references.

According to this second embodiment, the electrical connection 46 extends around the housing 16. The electrical connection 46 then forms a connecting cable comprising a core 56 and an insulation sheath 58. According to this embodiment, the electrical connection 46 is either flexible or rigid. The shape of the electrical connection 46 can then, in a particular variant in which it is flexible, be changed by hand by a user from a configuration in which it is substantially straight to a shape in which it is bent to connect the second connecting element 38 to the second connecting region 32.

According to this second embodiment, the inner reinforcement 102 is intended to insulate the housing 16 from the heating element 18. The inner insulating reinforcement 102 comprises a first inner reinforcement 102A and a second inner reinforcement 102B. The first inner reinforcement 102A and the second inner reinforcement 102B are preferably placed between box 16 and the heating element 18. The first inner reinforcement 102A and the second inner reinforcement 102B are radially spaced from each other defining a through space for the first connecting element 34 and a through space for the third connecting element 36. According to an alternative not shown, the inner reinforcement 102 is made of material. In this case, the element 102 includes a through hole for the connecting element 34 defining the through space for the first connecting element 34.

According to this second embodiment, the third connecting element 36 comprises a third electrode 52 and a third insulation contour 54.

The third electrode 52 passes through the housing 16. In particular, the third electrode 52 passes through the peripheral wall 22 of the housing 16. The third electrode 52 extends, for example, substantially radially relative to the housing 16. The third electrode 52 is connected on the one hand to the heating element 18 and on the other hand to the electrical connection 46.

In particular, the third electrode 52 is connected to the core 56 of the cable formed by the electrical connection 46.

The third insulation contour 54 is, for example, arranged around the third electrode 52 and is intended to electrically insulate the third electrode 52 from the housing 16.

The second connecting element 38 comprises, according to this second embodiment, the second electrode 44 and comprises an insulating foot 62. The second electrode 44 is then fixed radially to the outside of the housing 16 and does not pass through the peripheral wall 22 of the housing 16.

The insulating foot 62 is placed between the peripheral wall 22 of the housing 16 and the second electrode 44. The insulating foot 62 is intended to insulate the second electrode 44 from the housing 16.

In all of the above embodiments, the heating element 18 comprises only a first 30 and a second 32 connecting region and only two electrodes, each connected to one of the connection regions 30, 32.

The second connecting element 38 is intended to supply the heating element 18 with electricity via the third connecting element 36.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. An exhaust gas heating device comprising:
   a housing, comprising a peripheral wall extending along a central axis and delimiting an exhaust gas circulation passage;
   a heating element arranged in the housing and intended to heat exhaust gases circulating in the housing, the heating element comprising a first and a second connecting region arranged on either side of the heating element, the heating element defining a circulation circuit, the first connecting region and the second connecting region forming ends of the circulation circuit; and
   a power source for supplying electrical power to the heating element, the power source comprising,
      a first connecting element, connected to the first connecting region of the heating element, and intended to supply the heating element with electricity, the first connecting element comprising a first electrode passing through the peripheral wall of the housing,
      a second connecting element, comprising a second electrode intended to supply electricity to the heating element, and
      the power source comprises a third connecting element comprising an electrical connector, electrically connecting the second connecting element to the second connecting region of the heating element.

2. The exhaust gas heating device according to claim 1, wherein the first and second electrodes extend radially from the heating element and together form an angle about the central axis which is less than 180°.

3. The exhaust gas heating device according to claim 2, wherein the first and second electrodes extend radially from the heating element and together form an angle about the central axis which is less than 120°.

4. The exhaust gas heating device according to claim 3, wherein the first and second electrodes extend radially from the heating element and together form an angle about the central axis which is less than 90°.

5. The exhaust gas heating device according to claim 1, wherein the electrical connector extends in a space radially delimited between the heating element and the peripheral wall of the housing, the electrical connection comprising a connecting mat covered with an insulating layer, the second electrode being connected to the connecting mat and passing through radially the peripheral wall and the insulating layer.

6. The exhaust gas heating device according to claim 1, wherein the electrical connector extends around the housing, the electrical connector forming a connecting cable comprising a core and an insulation sheath, the second connecting element comprising an insulation foot, the insulation foot securing the second electrode to the housing, the second electrode being connected to the core of the connecting cable formed by the electrical connector.

7. The exhaust gas heating device according to claim 1, wherein the heating element comprises a metallic foam adapted to be heated by a joule effect when supplied with electricity by the power source.

8. The exhaust gas heating device according to claim 7, wherein the metal foam comprises a plurality of through slots extending parallel to the central axis, the plurality of through slots defining a circuit for circulating electricity through the metal foam in a back and forth pattern.

9. The exhaust gas heating device according to claim 1, wherein the second connecting element is axially offset from the first connecting element, the second connecting element extending upstream or downstream of the first connecting element, an axial offset between the first connecting element and the second connecting element being less than 100 mm.

10. The exhaust gas heating device according to claim 9, wherein the axial offset between the first connecting element and the second connecting element is less than 50 mm.

11. The exhaust gas heating device according to claim 10, wherein the axial offset between the first connecting element and the second connecting element is less than 10 mm.

12. An exhaust line comprising the exhaust gas heating device according to claim 1.

13. A vehicle comprising the exhaust line according to claim 12.

* * * * *